United States Patent [19]

Onoe et al.

[11] 3,821,666

[45] June 28, 1974

[54] MULTI-CRYSTAL OSCILLATOR FOR SELF TEMPERATURE COMPENSATION

[75] Inventors: Morio Onoe, Tokyo; Koichi Hirama, Chigasaki, both of Japan

[73] Assignee: Toyo Tsushinki Kabushiki Kaisha (also known as Toyo Communication Equipment Co., Ltd.), Kawasaki, Japan

[22] Filed: Mar. 30, 1973

[21] Appl. No.: 346,384

[30] Foreign Application Priority Data

Apr. 3, 1972 Japan .............................. 47-33321

[52] U.S. Cl. .................. 331/162, 331/167, 331/176

[51] Int. Cl. .............................................. H03b 5/32

[58] Field of Search ............ 331/116, 162, 167, 176

[56] References Cited

FOREIGN PATENTS OR APPLICATIONS 959,927 3/1957 Germany .............................. 331/162

*Primary Examiner*—John Kominski

*Attorney, Agent, or Firm*—Sughrue, Rothwell, Mion, Zinn & Macpeak

[57] ABSTRACT

A multi-crystal oscillator for self temperature compensation comprising three parallel connected oscillator elements each having substantially parabolic frequency temperature characteristics within a predetermined compensated temperature range. The three elements being chosen to have the effective turnover temperatures in lower temperature portion, middle temperature portion and higher temperature portion. The inductances of the elements of the lower and higher temperature portions are selected to be nearly identical and that of the middle temperature portion is selected higher than that of the other portions. The frequency temperature characteristics of the oscillator is so arranged to have less degradation in the compensated temperature range when the oscillation frequency is adjusted by varying the load capacitance.

3 Claims, 18 Drawing Figures

MULTI-CRYSTAL OSCILLATOR FOR SELF TEMPERATURE COMPENSATION

BACKGROUND OF THE INVENTION

1. Field of the Invention

The present invention relates to a multi-crystal oscillator for obtaining frequency temperature compensation. More especially, the present invention is concerned in a temperature compensating multi-crystal oscillator comprising three crystal elements connected in parallel and each having substantially parabolic temperature frequency characteristic in a predetermined compensating temperature range. The invention particularly concerns for the selection of equivalent inductance values of the three parallel crystal elements in order that the compensation characteristic of the oscillator does not unduly deteriorate due to adjustment of the oscillation frequency.

2. Description of the Prior Art

The demand for crystal oscillators having medium degree of accuracy shows more and more increase according to the popularization of frequency counters or high accuracy transceiver.

The major electric characteristics requested for such kind of oscillators are listed in the following Table-I, in which 5 items are to be taken into account.

TABLE I

| Item | Standards |
|---|---|
| Frequency deviation | $\pm 5\times10^{-6} \sim \pm 5\times10^{-8}$ |
| Compensated temperature range | 50°C ~ 120°C |
| Frequency adjustable range | $\pm 1\times10^{-8} \sim \pm 10\times10^{-6}$ |
| Warm up time | to be in the above standard value just after the switching on |
| Power consumption | as small as possible |

The conventional oscillators are classified into two systems. The first one is an oven system in which an oscillator is placed in an oven chamber and the oscillating frequency is stabilized by keeping the chamber temperature constant. The second one is a temperature compensation system using a temperature sensitive element associated with the oscillator element.

The first oven system has a serious drawback in that a considerable long time is required before the oven chamber arrives a required constant temperature and only thereafter a specified frequency stabilization is obtained. Because of such delay working, the oven system is not suitable for use in an application in which immediate operation of apparatus is requested after the switching on. Furthermore, this system requires a power for heating the oven after obtaining a specified frequency stability and such device consumes even more power than the oscillator portion. Therefore, the system is not suitable for a portable device due to its power consumption.

The second temperature compensation sysem using a temperature sensitive element and an oscillating element satisfies the above requirements for a short warm up time and a low power consumption, however, it is very difficult to satisfy the other practical requirements listed in the Table-I. More particularly, it is very difficult to satisfy the third item, i.e., the requirement for the frequency adjustable range. This is due to a fact that various non-linear elements, such as variable capacitance semi-conductors or thermisters, are used in this system and hence a small variation of the operating point by an adjustment of the frequency of the system may deteriorate to temperature compensation characteristic.

One temperature compensation system using 3 BT-cut crystals and a non-thermostat system had been disclosed along with calculated embodiments in: D. J. Fewings et al., "A Self Compensating Crystal Oscillator," The Marconi Review, vol XXX1 No. 169 Second Quarter 1968 pp.57–78. The above oscillator is a temperature compensating system using three oscillating elements of identical equivalent inductance and having substantially parabolic frequency temperature characteristics and having nearly equal turnover temperature intervals and slightly shifted turnover frequencies. The disclosure just shows one general embodiment having a frequency stability of $\pm1\cdot1\times10^{-6}$, and a compensated temperature range of 120°C obtained by calculation and did not refer to the realization of the circuit values.

However, in the above suggestion, due to nonproperness of selection of the inductance values of the equivalent inductance of respective oscillator elements, the deterioration of the frequency character, which will be explained further detail lateron, is considerable and as the result the third item of the Table-I, the requirement for the frequency adjustable range, is not fulfilled so that a practical device has never been realized.

This drawback will be explained in further detail hereinafter.

If we consider a case that three oscillator elements No. 1, No. 2 and No. 3 each having an identical inductance value and having frequency temperature chracteristics as shown by curves 1, 2 and 3 in FIG. 1 are connected in parallel as shown in FIG. 2 between terminals 11 and 12 and are connected in series with a negative load resistance $-R_L$ and a load capacitance $C_L$ so as to form an oscillator circuit having an equivalent load capacitance of $C_L=C_{L0}$ in this condition, then the composite frequency temperature characteristic becomes as curve 4 of FIG. 1, which shows a compensated frequency temperature characteristic having less frequency variation in a certain compensation temperature range.

By using the above idea, the first and second standards in Table-I can be satisfied. However, if the load capacitance is to be adjusted as $C_L=C_{L0} \pm\Delta C_L$ in order to satisfy the third standard to vary the oscillating frequency, then the composite compensation curve varies as shown curves 5, 6 and 7 of FIG. 3. This means that even at a certain load capacitance of $C_{L0}$, the first and second items in Table-I had been satisfied for instance as shown in curve 6 of FIG. 3, the standards can no longer be satisfied by varying the operating frequency as shown by curves 5 and 7.

SUMMARY OF THE INVENTION

The inventors considered that such change in frequency temperature characteristics by changing the operating frequency is mainly caused by a fact that the frequency sensitivity for the load capacitance by middle temperature portion of a compensating range is larger than that of higher or lower temperature portion after observing the characteristics shown in FIG. 3.

The present invention has for its object to mitigate above-mentioned disadvantage of the conventional oscillator and to obtain a practical multi-crystal oscillator having satisfactory temperature compensating characteristics for a desired range of adjusting frequencies.

The present invention has been obtained by a consideration of a fact that by choosing the equivalent inductance of the middle temperature portion to be higher than the equivalent inductances of the higher and lower temperature portions, which having an identical value, so that the load capacitance sensitivity of the middle temperature portion becomes substantially same with that of the other portions.

BRIEF DESCRIPTION OF THE DRAWINGS

The principle of the present invention will become more clear by the following description referring to the accompanied drawings, in which.

DESCRIPTION OF THE PREFERRED EMBODIMENT

The principle of the present invention will be explained by referring to the accompanied drawings.

Figure 4:
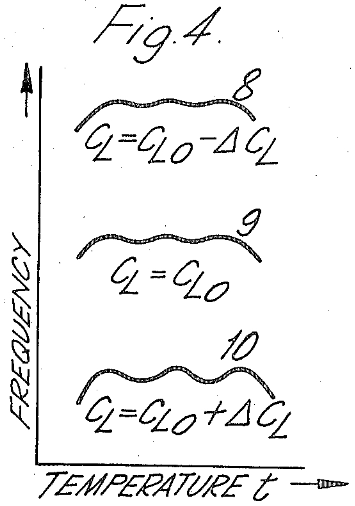
FIG. 4 shows an example of the frequency temperature characteristic curves of a multi-crystal oscillator made accordance with the principle of the present invention having higher equivalent inductance in the medium temperature portion to obtain a good frequency temperature characteristics.

FIG. 4 shows one example of frequency temperature characteristics obtainable in accordance with the present invention. In FIG. 4 curves 8, 9 and 10 show the cases when the respective load capacitance $C_L$ is changed as $C_L = C_{L0} \pm \Delta C_L$. As can be seen from the curves 8, 9 and 10, the maximum points in respective curves show substantially parallel displacement in order to satisfy the first and second requirements in Table-I even when the operating frequency is adjusted in a range of the third requirement.

In the above-mentioned D. J. Fewings' suggestion, three oscillation elements each having identical equivalent inductance are used. But the inventors had realized a fact that a practical oscillator having a wide frequency adjusting range and having a temperature compensating characteristic of less "degradation," which will be explained in more detail lateron, can only be realized by selecting the equivalent inductance of the middle temperature portion to be larger than the equivalent inductance of the higher or lower temperature portion being selected to have an identical value.

The idea of temperature compensation will be explained. At first theoretical analysis of the oscillator of the present invention based on several assumptions will be explained and then the reason for providing such assumption will be explained. The following analysis based on several hypothetical assumptions will give nearly complete natures of the temperature compensation characteristic of an oscillator system made in accordance with the present invention. The inventors had confirmed by actual experiments and by precise calculations based on formulae derived in the present invention that practical oscillators operating without such assumptions show fairly good temperature compensation effect and having substantially the same frequency temperature characteristics with that obtained by the theoretical analysis under the hypothetical assumptions.

The following four assumptions were introduced.

1. The loss of an oscillator element is neglected in view of its high Q value.

2. The frequency temperature characteristic of an oscillator element is assumed to be a parabolic form and its second-order coefficient is assumed to be identical for the three oscillator elements.

3. No deviation of characteristic exists for the products at the manufacturing and it can be made in sufficient approximation to the predetermined values.

4. Unless particularly mentioned, all the parameters are assumed to have no temperature depending characteristics.

Figure 5:
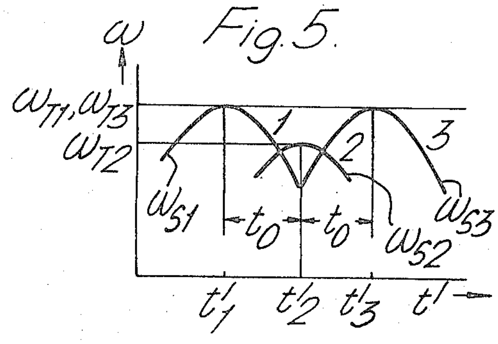
FIG. 5 is a frequency temperature characteristic curves in which the second-order coefficient is negative.

The three parallel connected oscillator elements No. 1, No. 2 and No. 3, which might be referred also as lower temperature portion, middle temperature portion and higher temperature portion, respectively, have each temperature characteristic of the series resonant angular frequency in parabolic form as shown by curves 1, 2 and 3 in FIG. 5. The abscissa of the graph of FIG. 5 is temperature $t'$ and the ordinate of the same is the angular frequency $\omega$. The three parabolic curves 1, 2 and 3 show temperature characteristics of the series resonant angular frequencies $\omega_{S1}$, $\omega_{S2}$ and $\omega_{S3}$ of the three oscillator elements No. 1, No. 2 and No. 3. The turnover temperatures $t'_1$, $t'_2$ and $t'_3$ of the curves 1, 2 and 3 in FIG. 5 are chosen to have identical intervals. Further the turnover angular frequencies $\omega_{T1}$ and $\omega_{T3}$ of the elements No. 1 and No. 3 are selected to satisfy the following formulae.

$$t'_2 - t'_1 = t'_3 - t'_2 \qquad (=t_0)$$

1

$$\omega_{T1} = \omega_{T3}\ (=\omega_0)$$

2

By the assumption that the second-order coefficients of the three oscillator elements are identical to be $a'$, the relation between the series resonant angular frequency $\omega_{si}$ and the temperature $t_i'$ of the oscillator elements of FIG. 5 becomes as follows.

$$\omega_{si} = \omega_{Ti} + a'(t'-t'_i)^2 \qquad (i = 1, 2, 3)$$

3

In the following explanation use is made a temperature $t$, which is a temperature deviating from the temperature $t'_2$ ($t'=t+t'_2$). Also popularly used idea of frequency deviation for the angular frequency is introduced. In this particular definition, series resonant frequency deviation $\delta_{si}$ means a ratio of deviating frequency from the turnover angular frequency $\omega_{T1}$ under consideration.

The series resonant frequency deviation $\delta_{si}$ can be expressed by the followings.

$$\delta_{si} = \omega_{si} - \omega_{T1}/\omega_{T1} \qquad (i = 1, 2, 3)$$

4

A turnover frequency separation $\delta_0$ is defined by the following formula with respect to the difference between the turnover angular frequency $\omega_{T2}$ of the middle temperature portion and the other mutually identical turnover angular frequencies $\omega_{T1}$ and $\omega_{T3}$.

$$\delta_0 = \omega_{T2} - \omega_{T1}/\omega_{T1}$$

5

The second-order coefficient a, when using the frequency deviation, is termed by the following.

$$a = a'/\omega_{T1}$$

6

The following relations are obtained by using formulae (3) and (1), (2), (4), (5) and (6).

$$\delta_{S1} = a(t+t_0)^2$$

$$``_{S2} = at^2 + \delta_0$$

$$\delta_{S3} = a(t-t_0)^2$$

7.

Figure 6:
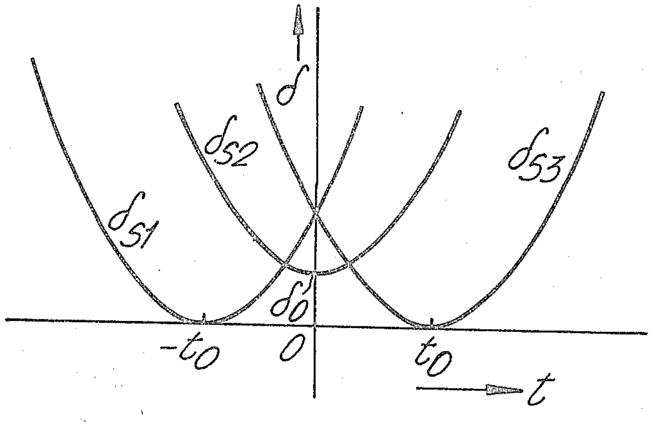
FIG. 6 is an illustrative frequency temperature characteristics in which the second-order coefficient is positive.

FIG. 6 is a diagram illustrating above relation.

In FIG. 6, the ordinate represents the frequency deviation $\delta$ deviating from the turnover angular frequency $\omega_{T1}$ of the oscillator element No. 1, which is now located at the origin, and the abscissa represents temperature $t$ making the turnover temperature $t'_2$ of the oscillator element No. 2 as the origin.

In FIG. 5, the characteristic curves are illustrated as convex curves since practical quartz oscillator elements having parabolic shaped frequency temperature characteristics have negative second-order coefficient. However, in FIG. 6 concave curves are illustrated by assuming the second-order coefficient as positive. In the following explanation, the description is made based on an assumption as the coefficients are positive just same as the case of FIG. 6. This assumption has been made only by a reason for simplifying the calculation.

Figure 1:
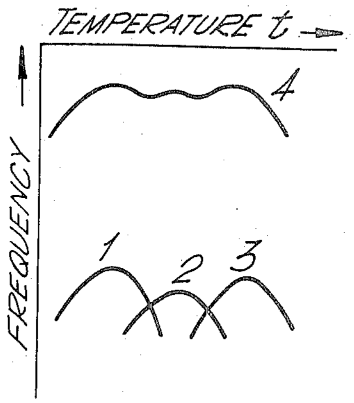
FIG. 1 shows frequency temperature characteristic curves of three oscillating elements individually and that for a combination thereof.
Figure 2:
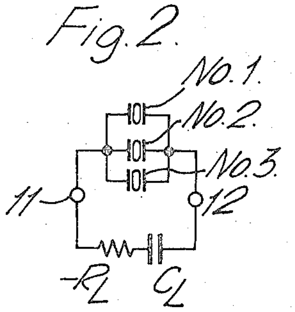
FIG. 2 shows a typical circuit for three elements multi-crystal oscillator.
Figure 7A:
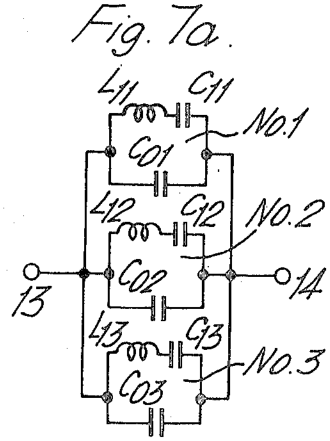
FIGS. 7*a* to 7*e* are equivalent circuit diagrams for explaining the present invention.

We may now consider a case that three oscillator elements No. 1, No. 2 and No. 3 are connected in parallel to form an oscillating circuit as shown in FIG. 2. An equivalent circuit diagram of the three parallel oscillator portion is as shown in FIG. 7a by assuming no circuit loss is included. As shown in FIG. 7a, equivalent inductances in the series arms of the three oscillators No. 1, No. 2 and No. 3 are represented by $L_{11}$, $L_{12}$ and $L_{13}$, respectively. Equivalent capacitance in the respective series arms are represented by $C_{11}$, $C_{12}$ and $C_{13}$, and the parallel capacitances are represented by $C_{01}$, $C_{02}$ and $C_{03}$, respectively. We may assume that the temperature dependent variation of the series resonant angular frequency is caused by temperature dependent variation of the equivalent capacitance in the series arm of the equivalent circuit of each oscillator element.

Figure 7B:
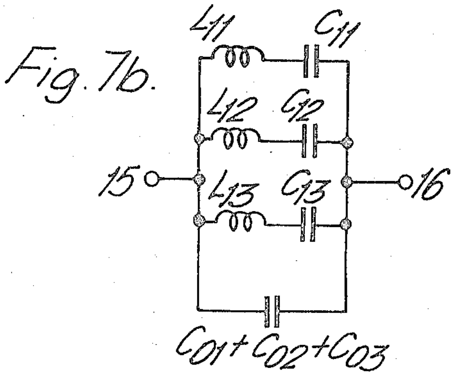
Figures 7C, 7D:
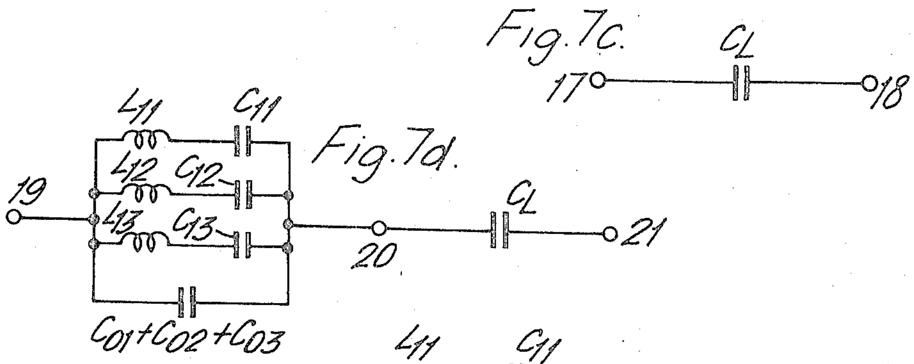
Figure 7E:
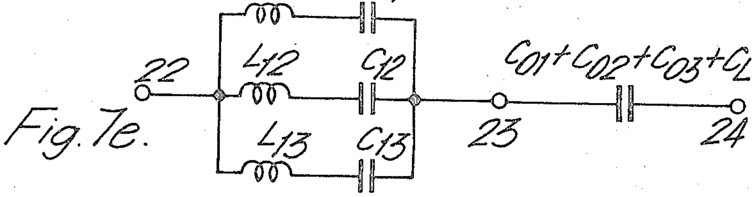

The equivalent circuit of FIG. 7a, may be modified as shown in FIG. 7b. In the oscillator circuit shown in the down side of FIG. 2, between terminals 11 and 12, the load resistance $R_L$ can be made as zero if considering to drive the oscillator elements having no loss so that the equivalent circuit becomes as shown in FIG. 7c. By connecting the equivalent circuit for the oscillator element portion shown in in FIG. 7b and that for oscillating circuit shown in FIG. 7c in series, then an equivalent circuit shown in FIG. 7d can be obtained. In this circuit, the oscillating frequency may be decided under a condition that the reactance between the terminals 19 and 21 being zero. This condition is just same as a condition of reactance between terminals 22 and 24 becomes zero in a modified equivalent circuit as shown in FIG. 7e. The following explanation will be given by referring to thus modified equivalent circuit diagram as shown in FIG. 7e. By using thus modified equivalent circuit diagram as shown in FIG. 7e, the analysis can be made easier since we can consider the analysis by separately considering into two portions, i.e., a parallel connected portion of the three series arms of the three oscillator elements between the terminals 22 and 23 and a capacitance portion formed by a sum of the load capacitance $C_L$ and three parallel capacitances $C_{01}$, $C_{02}$ and $C_{03}$ as connected between terminals 23 and 24.

At first we may consider the frequency characteristics of the reactance between the terminals 22 and 23 of FIG. 7e. The three series resonant angular frequencies may be written by the following formula by using subindexes shown in FIG. 7e.

$$\omega_{si} = 1/\sqrt{L_{1i}C_{1i}} \qquad (i = 1, 2, 3)$$

(8)

By defining respective reactances of each of the series arms as $X_i$, the following relation can be obtained, wherein $\omega$ is angular frequency near the series resonant point.

$$X_i = \omega L_{1i} - 1/\omega C_{1i} \qquad (i = 1, 2, 3)$$

(9)

Just in the same manner as has been done in the equation (4), we may define frequency deviation $\delta_i$ for an angular frequency $\omega$ deviating from each series resonant angular frequency $\omega_{si}$ of the respective oscillator element.

$$\delta_i = \omega - \omega_{si}/\omega_{si} \qquad (i = 1, 2, 3)$$

10

In the followings our consideration is based upon the frequency deviation as mentioned in the formulae (4), (5) and (10).

The formula (9) can be modified by using formulae 8 and 10 as follows.

$$X_i = \omega_{si}L_{1i}\delta_i(2-\delta_i+\delta_i^2+\dots) \qquad (i=1,\ 2,\ 3) \tag{11}$$

If we consider a case in which the angular frequency $\omega$ is only slightly differs from three series resonant angular frequencies $\omega_{si}$, the frequency deviation $\delta_i$ is much smaller than 2. Accordingly we may rewrite the right term of formula (11) in a close approximation by considering only the first term in the parenthesis, then the formula becomes as follows.

$$X_i = \omega_{si}L_{1i}2\delta_i \qquad (i = 1,\ 2,\ 3) \tag{12}$$

The inventors suggest to settle the equivalent reactances $L_{11}$, $L_{12}$ and $L_{13}$ of the three oscillator elements No. 1 (lower temperature portion), No. 2 (middle temperature portion) and No. 3 (higher temperature portion) as follows:

$$L_{11} = L$$
$$L_{12} = \alpha L$$
$$L_{13} = L \tag{13}$$

Wherein $\delta$ is a constant larger than 1 and L is a standard value of inductance. In accordance with the present invention, the equivalent inductance of the middle temperature portion is selected $\alpha$ times of the equivalent inductances L of the lower and higher temperature portion which are identical with each other.

The following relation can be obtained by introducing equations (13) into equation (12) for each item.

$$X_1 = \omega_{S1}L2\delta_1$$
$$X_2 = \omega_{S2}\alpha L2\delta_2$$
$$X_3 = \omega_{S3}L2\delta_3 \tag{14}$$

Wherein $\delta_i$ is the frequency deviation of frequency $\omega$ from the series resonant angular frequency $\omega_{si}$. The three series resonant angular frequencies $\omega_{si}$ deffer the value slightly with each other. The value thereof may vary according to the temperature according to equation (7). However, as the difference of values and variations are very small so that, as far as in the range to be considered, we may assume the following relation without causing practical inaccuracy.

$$\omega_{S1} = \omega_{S2} = \omega_{S3} = \omega_{T1}\ (= \omega_0) \tag{15}$$

wherein, $\omega_{T1}$ ($=\omega_0$) is the turnover angular frequency of the element No. 1 and is a constant. Furthermore the difference between $\omega_{T1}$ and $\omega_{T3}$ is small so that we may assume these are equal.

The right term of equation (10) is modified to be expressed by frequency deviation from $\omega_{T1}$ as follows.

$$\delta_i = \omega-\omega_{si}/\omega_{si}$$
$$= \omega-\omega_{T1}/\omega_{T1}\cdot\omega_{T1}/\omega_{si} - \omega_{si} - \omega_{T1}/\omega_{T1}\cdot\omega_{T1}/\omega_{si} \tag{16}$$

When considering equation (15):

$$\delta_i = \omega-\omega_{T1}/\omega_{T1} - \omega_{si}-\omega_{T1}/\omega_{T1} \tag{17}$$

Then by equation (4), the following relation establishes.

$$\delta_i = \delta-\delta_{si} \tag{18}$$

Wherein $\delta$ is the frequency deviation of an angular frequency $\omega$ deviating from the turnover angular frequency $\omega_{T1}$ of the oscillator element No. 1. This value $\delta$ is chosen as the ordinate of the graph of FIG. 6 and is defined by the following formula.

$$\delta = \omega-\omega_{T1}/\omega_{T1} \tag{19}$$

In the equation (14), $\delta_i$ is frequency deviation $\delta$ of an angular frequency $\omega$ deviating from the turnover angular frequency $\omega_{T1}$ of the oscillator element No. 1 and subtracted by the specific frequency $\delta_{si}$ of the series resonant angular frequency $\delta_{si}$. Namely $\delta_i$ represents reactance $X_i$ of the oscillator element in equation (14) by frequency deviation $\delta$ based on arbitrarily selected frequency and temperature $t$.

Then the reactance $X_T$ of the parallel connected series arms between the terminals 22 and 23 of FIG. 7e may be expressed by using reactance $X_i$ of the respective series arm as follows.

$$X_T = X_1X_2X_3/X_1X_2+X_2X_3+X_3X_1 \tag{20}$$

Then by introducing equation (7) into (18), and (15), (18) into (14) and, in turn (14) into (20) and after rearranging the factor with respect to the frequency deviation $\delta$;

$$D^3-(p+Bu)D^2+(g+Bv)D-(r+Bw) = 0 \tag{21}$$

wherein, $$p = 3T^2+2+D_0$$
$$q = 3T^4+2D_0T^2+(2D_0+1)$$
$$r = T^6+(D_0-2)T^4+(1-2D_0)T^2+D_0$$
$$u = 2+1/\alpha$$
$$v = 2\{(2+1/\alpha)T^2+(1+1/\alpha)+D_0\}$$
$$w = (2+1/\alpha)T^4+2(1-1/\alpha+D_0)T^2+(2D_0+1/\alpha) \tag{22}$$

In the above formulae, temperature $t$, frequency deviation $\delta$, turnover frequency separation $\delta_0$, and total reactance $X_T$ are normalized in the following manner.

$$T = t/t_0\ , \qquad D = \delta/\alpha t_{02}\ , \qquad D_0 = \delta_0/\alpha t_{02}$$
$$B = X_T/\omega_{T1}L2\alpha t_{02} \tag{23}$$

In the above formulae, the terms T, D, $D_0$, B are normalized temperature, normalized frequency deviation, normalized turnover frequency separation, and normalized total reactance, respectively.

The above formulae of (21) and (22) will give oscillation frequency of the multi-crystal oscillator, when the reactance between terminals 22 and 23 of FIG. 7e is $X_T$ represented by normalized frequency deviation D. The equation is ternary equation with respect to the normalized frequency deviation D and must have three real roots when the loss of other oscillator elements is assumed as zero as is the analysis of the present case.

Among the three real roots, only one root having minimum value has the temperature compensation effect of the frequency. In practice, as the practical oscillator element contains loss and hence the oscillation is possible only by the one real root.

The formulae (21) and (22) can be written as follows.

$$F(D, T, D_0, B, \alpha) = 0 \quad (24)$$

The above equation may be considered to represent relation between the normalized frequency deviation D and the normalized temperature T having parameters of normalized turnover frequency separation $D_0$, normalized total reactance B and equivalent inductance ratio $\alpha$.

Hereinafter, the necessary condition of the present invention will be explained. As the first necessary condition (i) the relation between, the normalized turnover frequency separation $D_0$, normalized total reactance B, and equivalent inductance ratio $\alpha$ is considered. Then as the essential feature of the present invention, (ii) the relation between various parameters which realizing parallel movement of the frequency temperature characteristics parallel with frequency axis, at a minor change of oscillation frequency is taken into consideration.

Figure 8:
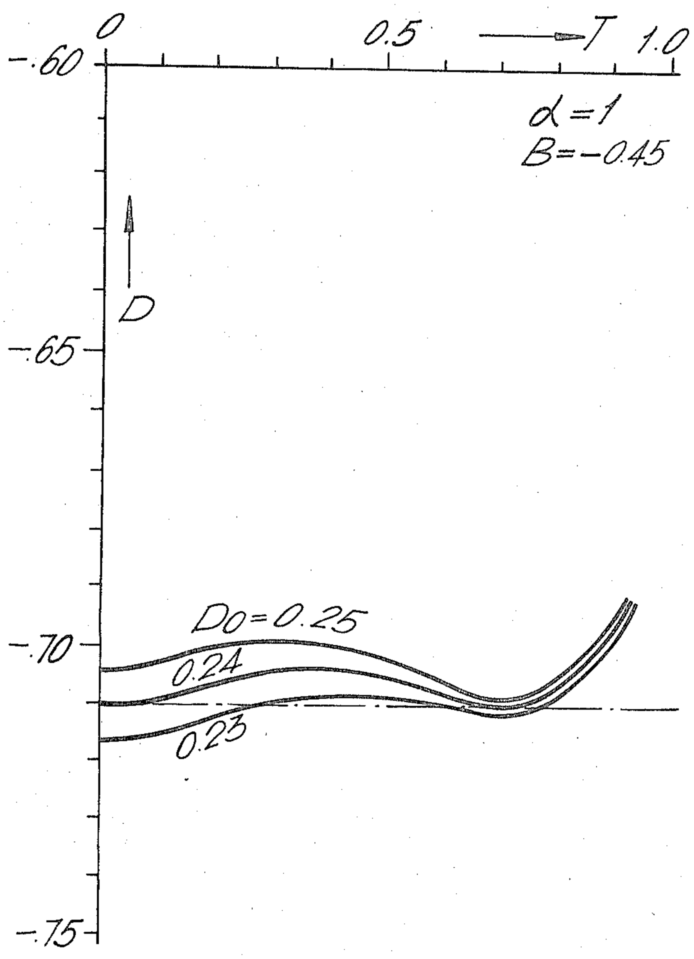
FIG. 8 is a graph showing one solution of the frequency formula.

At first "equal ripple characteristics" may be considered. FIG. 8 shows one example of numerical solution of frequency equations shown in formulae 21 and 22. In FIG. 8, the ordinate is chosen to be normalized frequency deviation D and the abscissa is chosen to be normalized temperature T. This figure shows only the minimum root of the normalized frequency deviation D which provides temperature compensating effect for the frequency. Furthermore, as the frequency temperature compensation characteristic curve is symmetrical with the ordinate, the normalized temperature axis, only the positive portion of the curve is shown.

The conditions for obtaining numerical solution are that the normalized overall reactance $B=-0.45$, equivalent inductance ratio $\alpha=1$. Three frequency temperature characteristics curves shown in FIG. 8 correspond to each of the cases of normalized turnover frequency separation of the turnover point of the middle temperature portion being 0.23, 0.24 and 0.25.

As can be seen from FIG. 8, in case the normalized turnover frequency separation of the middle temperature portion $D_0$ is 0.24, the frequency temperature characteristic shows "equal ripple characteristics," which means that the normalized frequency deviation D on the curve $D_0=0.24$ has two minimum points of an identical value as shown by chain line. This condition is the optimum condition being desired at temperature compensation for the frequency deviation over the wide temperature range.

Figures 9, 10:
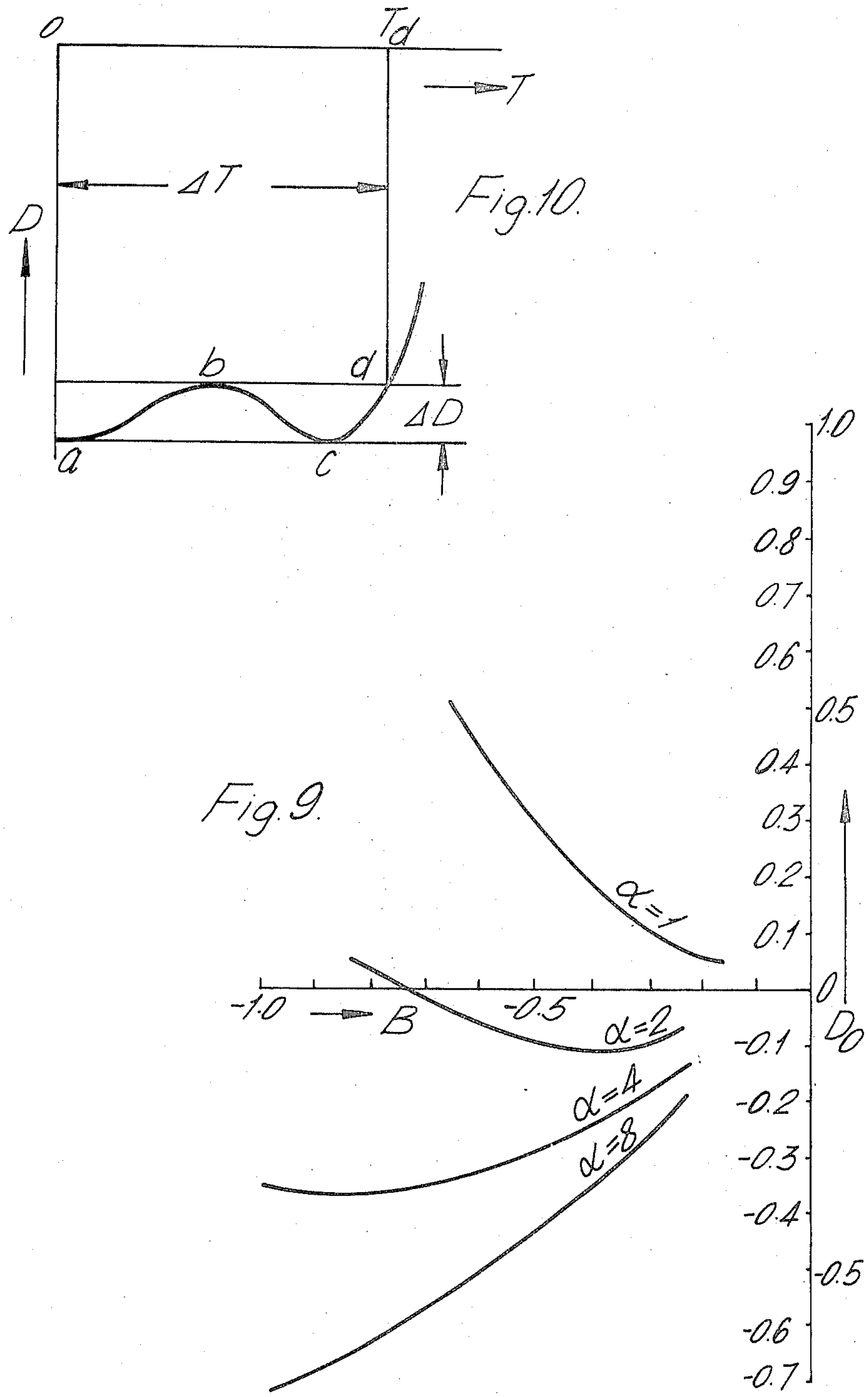
FIG. 9 is a graph illustrating the relation between equivalent inductance ratio $\alpha$ and normalized total reactance B and also normalized turnover frequency separation $D_0$ when the frequency temperature characteristics show equal ripple characteristics.
FIG. 10 is a graph for explaining definition of normalized frequency deviation $\Delta D$ and normalized temperature compensating range $\Delta T$.

FIG. 9 shows one numerical example for the normalized turnover frequency separation $D_0$ for a given total reactance B under condition that the frequency temperature characteristics show "equal ripple characteristics," and that the equivalent inductance ratio $\alpha$ is fixed under practical range of the various parameters.

In FIG. 9, ordinate is normalized turnover frequency separation D, abscissa is normalized total reactance B and the parameters are selected $\alpha=1$, $\alpha=2$, $\alpha=4$ and $\alpha=8$. For the cases in which $\alpha$ has different value from, above the obtained characteristic curves show "equal ripple characteristics" and also in these cases, normalized total reactance B or normalized turnover frequency separation $D_0$ can be calculated.

One numerical example for the relation between the normalized turnover frequency separation $D_0$, equivalent inductance ratio $\alpha$ and normalized total reactance B showing "equal ripple characteristics" in the frequency temperature characteristics had been obtained as shown by FIG. 9.

Then a figure of merit $\Psi$, a quantity for showing the quality of the "equal ripple characteristics" may be considered.

As for quantities for defining the "equal ripple characteristics," the following two factors are defined, i.e., variation of the normalized frequency deviation $\Delta D$ and normalized compensation temperature range $\Delta T$ by using FIG. 10. In FIG. 10, the ordinate is chosen to be the normalized frequency deviation D, and the abscissa is the normalized temperature T. The points *a* and *c* are the two minimum points having the normalized frequency deviation $D_a$ and $D_c$ $(= D_a)$, respectively. The point *b* in FIG. 10 represents maximum point of the concave portion of the curve having the normalized frequency deviation $D_b$. A point *d* having equal normalized frequency deviation with that of the point *b* is settled on the curve as shown in FIG. 10. The normalized temperature of point *d* is illustrated by $T_d$. The variation of the normalized frequency deviation $\Delta D$ and normalized temperature compensation range $\Delta T$ may be defined by the following formulae.

$$\Delta D = D_a - D_b$$

$$\Delta T = T_d \quad 25$$

In the present invention, a "figure of merit $\Psi$" for the evaluation quantity of "equal ripple characteristics" by using said two factors of the variation of the normalized frequency deviation $\Delta D$ and the normalized compensation temperature range $\Delta T$ is defined by the following formula.

$$\Psi = (\Delta T)^2/\Delta D \quad (26)$$

This figure of merit $\Psi$ has been defined by considering not only the frequency variation but for the compensation temperature range. The formula (26) has no higher order term, but by using the equation, the practical degree of the compensation characteristics can easily be estimated. As can be seen from formula (26), the compensation characteristic becomes better according to the increase of the figure of merit $\Psi$. However, according to the increase of this figure of merit $\Psi$, the elements of oscillator becomes difficult to realize. As can be seen from FIG. 11, the normalized total reactance B must be negative and must have a large absolute value for obtaining a large figure of merit $\Psi$, when the equivalent inductance ratio $\alpha$ is constant.

In case of a quartz oscillator having parabolic frequency temperature characteristics, the second-order coefficient is negative so that from the formula (23), the combined reactance $X_T$, i.e., the reactance between terminals 22 and 23 of FIG. 7*e* becomes inductive. In order to make the resultant reactance between terminals 22 and 24 of FIG. 7*e* to be zero, the reactance between terminals 23 and 24 of FIG. 7*e* must be capacitive and must have its absolute value equal to $X_T$. Said later reactance consists of sum of the load capacitance $C_L$ and three parallel capacitances $C_{01}$, $C_{02}$ and $C_{03}$, which sum is termed hereinafter as total parallel capacitance.

In this connection if an equivalent inductance is given the parallel capacitances $C_{01}$, $C_{02}$ and $C_{03}$ become definite values so that only the load capacitance $C_L$ can be varied at will. Therefore, if the figure of merit $\Psi$ should be made larger, the total parallel capacitance becomes smaller and accordingly the load capacitance $C_L$ becomes smaller. In such case, as is usual for the normal quartz crystal oscillator, the oscillation becomes impossible due to an increase of the effective resistance. If we choose an extremely large figure of merit $\Psi$, the total parallel capacitance must have a value smaller than the sum value of the parallel capacitances and the load capacitance must have a negative value so that practical element can not be realized.

By deciding equivalent inductance ratio $\alpha$ and normalized total reactance B and by settling the normalized turnover frequency deviation $D_0$ to have "equal ripple characteristics" as shown in FIG. 9, the corresponding normalized variation of frequency deviation $\Delta D$ and the normalized compensation temperature range $\Delta T$, and now the figure of merit $\Psi$ can be obtained from equation (26). In other words, if the equivalent inductance ratio $\alpha$ and the normalized total reactance B are decided, a corresponding figure of merit $\Psi$ is decided.

Figures 11, 12:
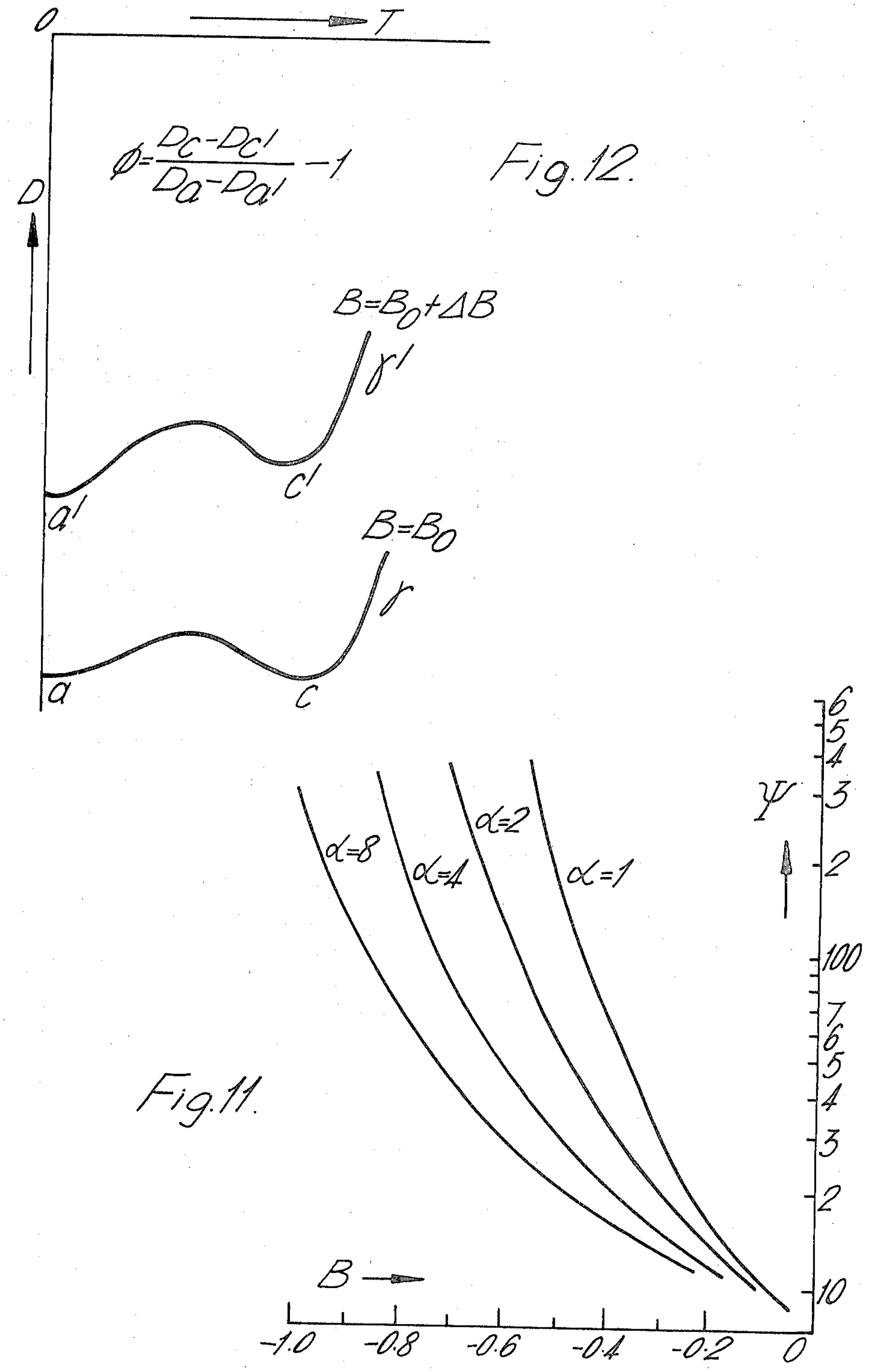
FIG. 11 is a graph showing relation between figure of merit $\Psi$, B and $\alpha$.
FIG. 12 is a graph for explaining degradation factor $\phi$.

FIG. 11 shows one numerical embodiment showing the relation between the figure of merit $\Psi$ and normalized total reactance B, in which the ordinate is the figure of merit $\Psi$, the abscissa is normalized total reactance B and the parameter is the equivalent inductance ratio $\alpha$.

From FIG. 11, it can be seen that there are a indefinite number of combinations of the equivalent inductance ratio $\alpha$ and the normalized total reactance B for giving a certain figure of merit $\Psi$. Namely, for a certain figure of merit which will give, as an optimum temperature compensation of frequency temperature characteristics of the invention, the "equal ripple characteristics," the equivalent inductance ratio $\alpha$ and the normalized total reactance B can be chosen considerably freely based on FIG. 11. However, in order to satisfy less "degradation" which forms the main subject of the present invention, there will be no such freedom for choosing the equivalent inductance ratio $\alpha$ and the normalized total reactance B and the both quantities must have definite values. Hereinafter, the equivalent inductance ratio may be taken into consideration, which is a conveniently considered quantity for practical design of a temperature compensating multi-crystal oscillator among two necessary factors of the equivalent inductance ratio $\alpha$ and the normalized total reactance B in order to realize not only the "equal ripple characteristics" but for satisfying the requirement of less "degradation".

Figure 3:
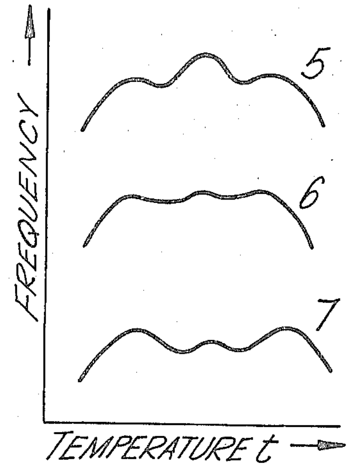
FIG. 3 shows frequency temperature characteristic curves of a conventional multi-crystal oscillator illustrating the fact that requirements are not fulfiled by frequency adjusting.

In the usual requirement for such kind of an oscillator, the frequency adjustable range is defined for instance as shown in the Table-I, item 3. This requirement means that the oscillator satisfies both the requirements for the frequency deviation and the compensated temperature range when the oscillating frequency is adjusted in a range specified in the Table-I. This requirement has been defined based on a consideration that if the initial temperature compensation characteristics were greatly distorted at other frequencies as shown by the curves 5 and 7 of FIG. 3 when a frequency drift which may be due to aging at a certain frequency is adjusted, then the effect of temperature compensation is lost and the device becomes unpractical. Accordingly a function that the temperature compensation curve moves parallel to the direction of frequency axis is requested when the oscillation frequency is slightly adjusted. In practice it is frequent that such parallel movement is not attained.

As an amount to evaluate such irregularness "degradation factor" is defined which will be explained by referring to FIG. 12. It is assumed that curve $\gamma$ in FIG. 12 has "equal ripple characteristics" at a normalized total reactance $B=B_0$ when the equivalent inductance ratio $\alpha$ and the turnover frequency separation $D_0$ are given for instance such as shown in FIG. 8. The frequencies of two minimum points are $D_a$ and $D_c$, respectively. The other curve $\gamma'$ in FIG. 12 is made almost under same conditions as the curve $\gamma$ except the fact that only the normalized total reactance is slightly varied to be $B = B_0+\Delta B$. The frequencies of the two minimum points in this case is $D_a'$ and $D_c'$. Then the "degradation factor" $\phi$ is defined by the following formula.

$$\phi = D_c'-D_c/D_a'D_a -1 \qquad (27)$$

Figures 13, 14:
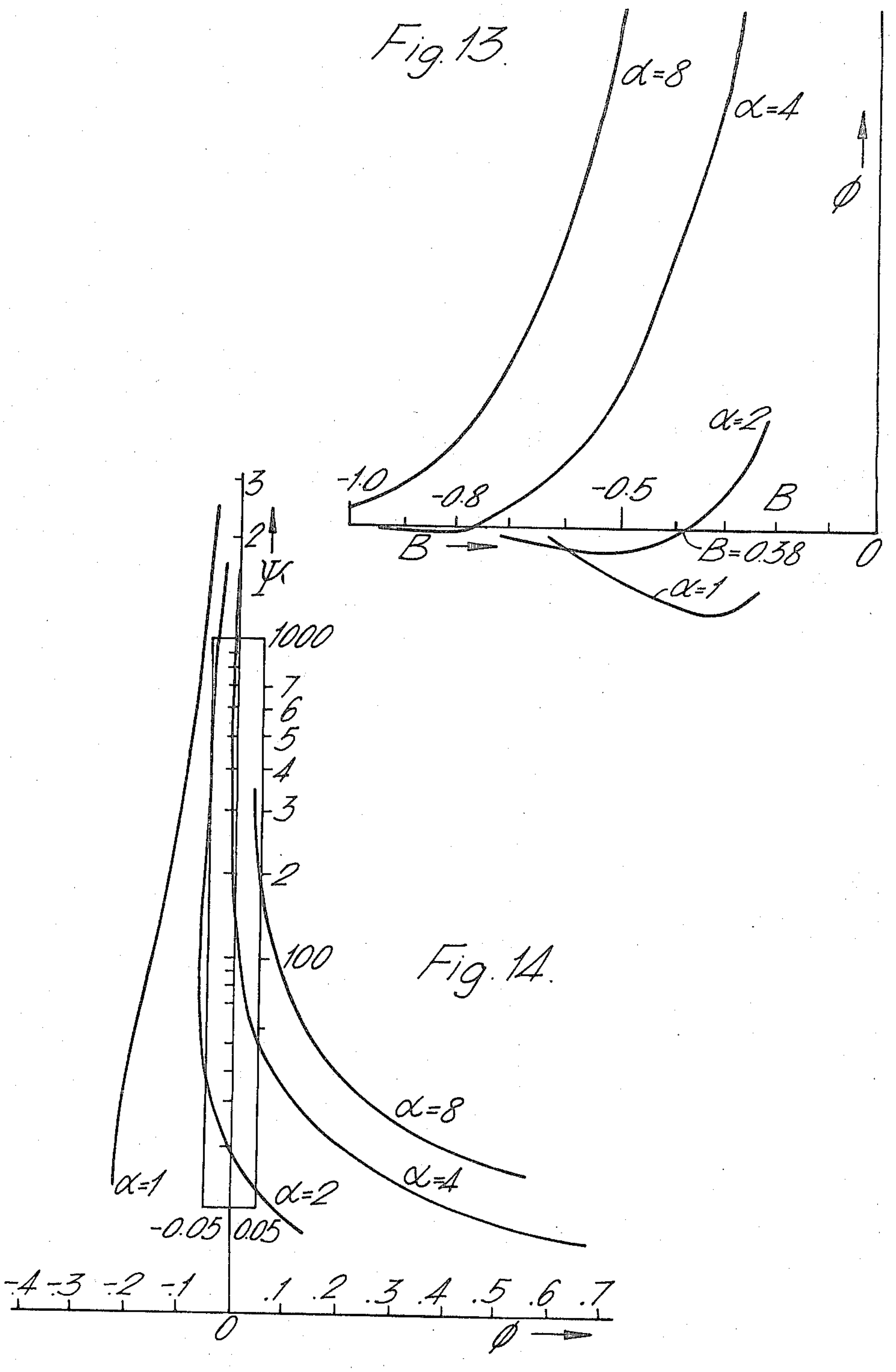
FIG. 13 shows relation between B, $\phi$ and $\alpha$.
FIG. 14 shows relation between $\phi$, $\Psi$ and $\alpha$.

FIG. 13 is a numerical example showing the relation between the "degradation factor" $\phi$ and normalized total reactance B, in which the equivalent inductance $\alpha$ is chosen to be the parameter. The ordinate is "degradation factor" $\phi$ and the abscissa is normalized total reactance B, wherein an increment $\Delta B$ of the normalized total reactance B is chosen to be 0.005. This increment $\Delta B$ of 0.005 is selected by a reason that it is an amount sufficiently small with respect to the amount of $B_0$ under consideration and is a value sufficiently large to obtain desired calculation accuracy.

As can be understood by the equation (27), the compensation curve shows movement nearer the parallel movement as the "degradation factor" $\phi$ becomes nearer to zero. Referring to FIG. 13, $\phi$ shows a value that $\phi$=0, when $\alpha$=2 and $B$=−0.38. In this case the parallel movement requirement is satisfied at a small variation of B. This operating point should be chosen under the following condition. The "degradation factor" $\phi$ is expanded as follows under a given normalized total reactance $B_0$.

$$\phi = \alpha_0+\alpha_1\Delta_B+\alpha_2(\Delta B)^2+ \qquad (28)$$

At the above operation point, in which $\alpha$=2 and $B$=−0.38, according to the equation, the zero order term has value zero, but its first order term has a considerably large value. Accordingly, if a wide frequency adjusting range is desired, an operating point should be chosen in which up to more higher order terms become zero. Such points may be chosen in FIG. 13 so that the equivalent inductance ratio $\alpha$ is a certain curve, in which the "degradation factor" $\phi$ is small and that the curve is substantially parallel to the abscissa. In the illustrated embodiment, the operating points may be chosen on curve $\alpha$=4 at portion about $B$=−0.8 to −0.9.

In the foregoing, it has been described that according to the main object of the present invention, a characteristic for satisfying parallel moving characteristics and having as the optimum compensation characteristics, the "equal ripple characteristics" by a selection of equivalent inductance ratio $\alpha$ larger than 1.

Hereinafter, the relation between the degradation factor $\phi$ and the figure of merit $\Psi$ will be considered. FIGS. 13 and 11 are the numerical embodiments calculated by making the degradation factor $\phi$ and normalized total reactance B as independent variables and by taking the equivalent inductance ratio $\alpha$ as the parameter. FIG. 14 shows one numerical embodiment for the relation between the degradation factor $\phi$ and the figure of merit $\Psi$ by making the equivalent inductance ratio $\alpha$ as the parameter, which relation has been obtained by using above two relations shown in FIGS. 13 and 11 after eliminating the normalized total reactance B therefrom. In FIG. 14, the ordinate is the degradation factor $\phi$ and the abscissa is the figure of merit $\Psi$.

It may be seen from FIG. 14 that an equivalent inductance ratio $\alpha$ which should bring the degradation factor $\phi$ close to zero is determined if a certain figure of merit $\Psi$ corresponding to a desired temperature compensation is given.

When a figure of merit $\Psi$ for an oscillator of medium grade is required to obtain under a given standard of frequency deviation and compensated temperature range as described in Table-I and then three crystal oscillator elements are used for three oscillators, the second-order coefficient a of frequency-temperature characteristic lies around the range of $$0.02\times10^{-6}/(°C)^2 < -a < 0.04\times10^{-6}/(°C)^2 \quad 29.$$

so that from Table-I and equations 23 and 26, the figure of merit $\Psi$ should be limited to the following range.

$$20 < \Psi < 1{,}000 \quad 30$$

In more detail, this means that values of $\Psi$ for a composite oscillator consisting of three elements are restricted to the condition of equation (30) as a result of exclusion of such cases that according to equation (26) the condition of $1{,}000 < \Psi$ must be fulfiled for the purpose of proportioning the values of width $\Delta D$ between $D_a$ and $D_b$ and the value of $\Delta T$ within practical ranges and that any element having a value of $\Psi$ less than 20 can be realized even by a single oscillator.

Moreover, in practice, it is desired that the value of the degradation factor $\phi$ should be chosen within a following range.

$$|\phi| < 0.05 \quad 31.$$

As also seen from FIG. 14, this is based on a fact that the absolute value of the degradation factor $|\phi|$ should be maintained small against various values of $\Psi$. This limit is considered under condition that even if the oscillator frequency is deviated 20 times of $\Delta D$ of FIG. 10, which satisfies the "equal ripple characteristics," the degradation of the compensation characteristic should be maintained at a degree that the "equal ripple characteristics" is not unduly deteriorated in practice.

From these two conditional equations (30) and (31), the equivalent inductance ratio $\alpha$ according to the invention is chosen to fulfil $$\alpha > 1 \quad 32.$$

Such limitation is imposed due to the fact, as shown in FIG. 14, that the curve for $\alpha=1$ is located substantially outside the range of $|\phi| < 0.05$.

That is to say, a temperature compensation characteristic having "equal ripple characteristics" is achieved by selecting the equivalent inductance of the middle temperature portion larger than those of the higher and lower temperature portions which are equal each other. Moreover, such characteristic which is the principal object of the invention and that the compensation curves are shifted in parallel to the direction of the axis of frequency at slight change of frequency occurs can be provided under the same selection.

The equation (32) may be rewritten by the aid of equation (13) as follows:

$$L_{11} = L_{13}$$
$$L_{12}/L_{11} < 1$$
$$L_{12}/L_{13} < 1 \quad 33.$$

Upon actual manufacturing it is impossible to realize values of these inductances to exactly coincide with those obtained by calculation. However, as will be explained lateron, if the following relations between the equivalent inductances $L_{11}$, $L_{12}$ and $L_{13}$ of the three oscillator elements $$L_{11} \approx L_{13}$$
$$L_{12}/L_{11} < 1$$
$$L_{12}/L_{13} < 1 \quad 34$$

are realized by slightly adjusting the frequencies and the effective turnover temperatures of the three elements, it is possible by changing the load capacitance to provide such characteristic that a frequency-temperature characteristic curve is shifted substantially in parallel within the range of temperature compensation.

Now, the basis of the assumptions previously mentioned will be reviewed and reconsidered.

Firstly, assuming that the oscillator elements used have high values of Q, their loss is omitted. The practical elements such as crystal oscillators have Q-values of several ten thousands, resulting in very small loss. Therefore, said assumption is considered to have no influence.

Otherwise, existence of roots which is previously put out of consideration is reviewed. The frequency equations (21) and (22) resulting from omission of loss always have three real roots. However, taking account of loss there are two cases of one real root and three real roots (including the case of a real root and a double root). In the case of one real root it is apparent from numerical calculation and/or experiment taken account of loss that this root corresponds to that provides temperature compensation effect expressed in equation (21) and (22). Moreover, in the case of three real roots, equivalent resistances of the three roots are finite and their respective values are generally unequal. By numerical calculation and/or experiment with consideration of loss it is found that an equivalent resistance which corresponds to a root providing the temperature compensation effect defined in equations (21) and (22) is minimum. Accordingly, oscillation is rendered at a frequency corresponding to a root, which provides temperature compensation effect, among roots of equations (21) and (22).

Secondly, the frequency-temperature characteristics of the oscillators themselves were in parabolic shape and all of their three second-order coefficients were equal. In practice, it is well known that BT or DT-cut oscillator elements of crystal have frequency-temperature characteristic such that it can be approximated considerably well by a parabolic curve and its turnover temperature can be varied over considerably wide range of temperature by changing the cut-angle of the crystal. Under these circumstances a second-order coefficient which is obtained in the above-mentioned manner and defined by approximating the frequency-temperature characteristic to a parabolic curve within the temperature compensation range is referred to as an effective second-order coefficient. When the turnover temperature exists within the range used according to the invention, the effective second-order coefficient may be considered to be substantially constant.

Similarly, a turnover temperature and a turnover frequency defined by approximating a corresponding frequency-temperature characteristic to a parabolic curve are called as an effective turnover temperature and an effective turnover angular frequency, respectively. According to the invention, such effective values are used for all of various values stated previously.

Thirdly, dispersion or inhomogeneity upon manufacturing is reviewed. First of all, it is well known that inhomogeneous series resonant angular frequencies of the three oscillator elements can be brought sufficiently close to desired values by connecting respective elements of considerably small reactive values in series with each of the oscillator elements. In this case, variation of the equivalent inductance occurs simultaneously, however, such variation in value of the equivalent inductance caused upon adjusting dispersion in frequency of the oscillator elements manufactured in conventional manner is very small, and hence can be neglected. Both of dispersion in the equivalent inductance and effective turnover temperature and slight difference in the effective second-order coefficient act so as to deviate the frequency-temperature characteristic from its symmetrical form with respect to the frequency-axis, or deviate from "equal ripple characteristics." However, characteristic curves close to ideal ones can be obtained by slightly adjusting the frequencies and effective turnover temperatures of the three oscillator elements.

As far as the degradation to which the invention is directed is satisfied, dispersion in parallel capacitances of respective oscillator elements made by conventional way gives rise no problems.

Moreover, we have assumed that the various parameters of constructive elements for instance, the capacitances $C_{11}$, $C_{12}$ $C_{13}$, etc. shown in FIG. 7*e*, have no temperature depending characteristics. However, even if temperature variation of such factors apart from the series resonant angular frequency taken into account in the aforesaid analysis is considered, it acts to somewhat deviate symmetry of the temperature compensation characteristic curve with reference to its frequency axis or deviate "equal ripple characteristics." However, such deviation of characteristics from ideal form is very minor and in practice can be brought close approximation to the ideal ones by slightly adjusting frequencies and effective turnover temperatures of the three oscillator elements.

Consequently, even if some of the assumptions made previously is not attained, characteristics, which are close to an ideal characteristic, i.e., "equal ripple characteristics" and less "degradation," can be attained by adjusting effective turnover temperatures of respective oscillator elements and reactances connected in series with respective oscillator elements.

In the foregoing, the invention has been explained with respect to conditions on which "equal ripple characteristics" that is ideal and most useful characteristic is improved. However, it is additionally stated that even though there exists any incoincidence with "equal ripple characteristics," such characteristics that a temperature compensation characteristic curve is shifted in parallel within the range of temperature compensation can be attained by choosing the equivalent inductance ratio $\alpha$ greater than unity.

Manner of changing the equivalent inductance values of the oscillator elements will be explained hereinbelow. It is well known that a value of equivalent inductance can be varied in piezoelectric oscillator elements by changing dimensions of electrodes attached thereto and especially, in contour oscillators over wide range by changing thickness of piezoelectric plate.

Now, the inventor proposes a method for changing values of effective equivalent inductances by connecting elements of considerably high reactance in series with the oscillator elements. According to this method, oscillator elements which are easily manufactured and have substantially equal equivalent inductances may be used to construct the temperature compensated composite oscillator of the invention.

In this method, the frequency also varies simultaneously. However, such increments of frequency are predictable, so that pre-adjustment of the frequency of the oscillator element itself to such value that said increments were subtracted does not need any additional process upon manufacturing.

Also, in this case, dispersion in frequency of the oscillator elements can be adjusted by means of said additional reactive elements for changing the value of equivalent inductance.

According to the present invention, as it is possible to obtain a multi-crystal oscillator comprising three parallel connected oscillator elements of which middle temperature element is so designed to have a larger inductance value and by merely adjusting the adjustable portion thereof the oscillator can be made operative in a predetermined adjustable frequency range under a given compensating temperature range and frequency deviation, and being operable substantially simultaneous with switching on and without power consumption. The present invention is particularly effective for stabilizing oscillators for use frequency counters, high accuracy transceiver, etc.

Various modifications might be possible without departing from the scope of the present invention.

What is claimed is:

1. A multi-crystal oscillator for self temperature compensation comprising three parallel connected oscillator elements each having substantially parabolic frequency temperature characteristics within a predetermined compensated temperature range, the invention consists in that effective turnover temperatures of said three oscillator elements being chosen to be lower temperature portion, middle temperature portion and higher temperature portion and that values of equivalent inductances of said three elemtns $L_{11}$, $L_{12}$ and $L_{13}$ are chosen according to the following 3 formulae;

$$L_{11} \approx L_{13}$$

1

$$L_{12}/L_{11} < 1$$

$$L_{12}/L_{13} < 1$$

so that frequency temperature characteristic curve of the oscillator can be adjusted to have substantially less degradation in said compensated temperature range by varying load capacitance.

2. A multi-crystal oscillator for self temperature compensation as claimed in claim 1, wherein the effective equivalent inductance value of the oscillator elements may be varied by connecting an element in series having a considerably high reactance value.

3. A multi-crystal oscillator as claimed in claim 1, characterized in that the oscillator comprises figure of merit $\Psi$ and degradation factor $\phi$ in the following range:

$$20 < \Psi < 1{,}000$$

$$-0.05 < \phi < 0.05$$

wherein, the figure of merit $\Psi$ is given by, $$\Psi = (\Delta T)^2/\Delta D$$

and the degradation factor $\phi$ is given by, $$\phi = D_c'-D_c/D_a'-D_a - 1$$

wherein, $\Delta D$ represents variation of normalized frequency deviation at a frequency temperature characteristic having two minimum points of equal oscillation frequency and $\Delta D$ is difference of normalized frequency deviation between the minimum frequency point and most deviated frequency point in a desired compensated temperature range, $\Delta T$ is a normalized compensation temperature range corresponding to half of the desired compensated temperature range, $D_a$ and $D_c$ are normalized frequency deviations of the two minimum points having identical value at the equal ripple characteristics, $D_a'$ and $D_c'$ are normalized frequency deviations of corresponding points with said two points when oscillation frequency of the oscillator is adjusted.

* * * * *